(12) United States Patent  
Pally et al.

(10) Patent No.: US 6,722,497 B2
(45) Date of Patent: Apr. 20, 2004

(54) MAGAZINE FOR FASTENING ELEMENTS

(75) Inventors: Andreas Pally, Baar (CH); Gerd Daubinger, München (DE)

(73) Assignee: Hilti Aktiengesellschaft, Schaan (LI)

( * ) Notice: Subject to any disclaimer, the term of this patent is extended or adjusted under 35 U.S.C. 154(b) by 287 days.

(21) Appl. No.: 09/898,374

(22) Filed: Jul. 3, 2001

(65) Prior Publication Data

US 2003/0044230 A1 Mar. 6, 2003

(30) Foreign Application Priority Data

Mar. 28, 2001 (DE) .......................................... 101 15 369

(51) Int. Cl.[7] .......................... B65D 85/24; F16B 15/08
(52) U.S. Cl. ...................... 206/347; 206/338; 411/442
(58) Field of Search ........................ 206/231, 338–347; 411/442, 443

(56) References Cited

U.S. PATENT DOCUMENTS 5,509,768 A * 4/1996 Hon ........................... 411/442
5,788,445 A * 8/1998 Huang ........................ 411/442
5,913,421 A * 6/1999 Shinjo ........................ 206/341
6,098,801 A * 8/2000 McCardle et al. .......... 206/443

* cited by examiner

Primary Examiner—Jim Foster
(74) Attorney, Agent, or Firm—Sidley Austin Brown & Wood, LLP

(57) ABSTRACT

A magazine has an elongated carrier strip (12) which carries several fastening elements (13) arranged one behind the other. For each fastening element (13), the carrier strip (12) has several receiving surfaces, each receiving surfaces being formed by a support surfaces (1) having an opening (11) and by two side members (2, 3) whose end parts are connected to each other and which jointly form a passage (5). The diameter of the opening (11) and of the passage (5) essentially match the diameter of the shaft (15) of the fastening element (13). Extending from the circumference of the opening (11), there are at least two slits (7, 8, 9, 10) which divide the circumferential area of the opening (11) into two circular ring segments that can be pivoted downwardly into the interior of the magazine.

10 Claims, 4 Drawing Sheets

Figure 8:
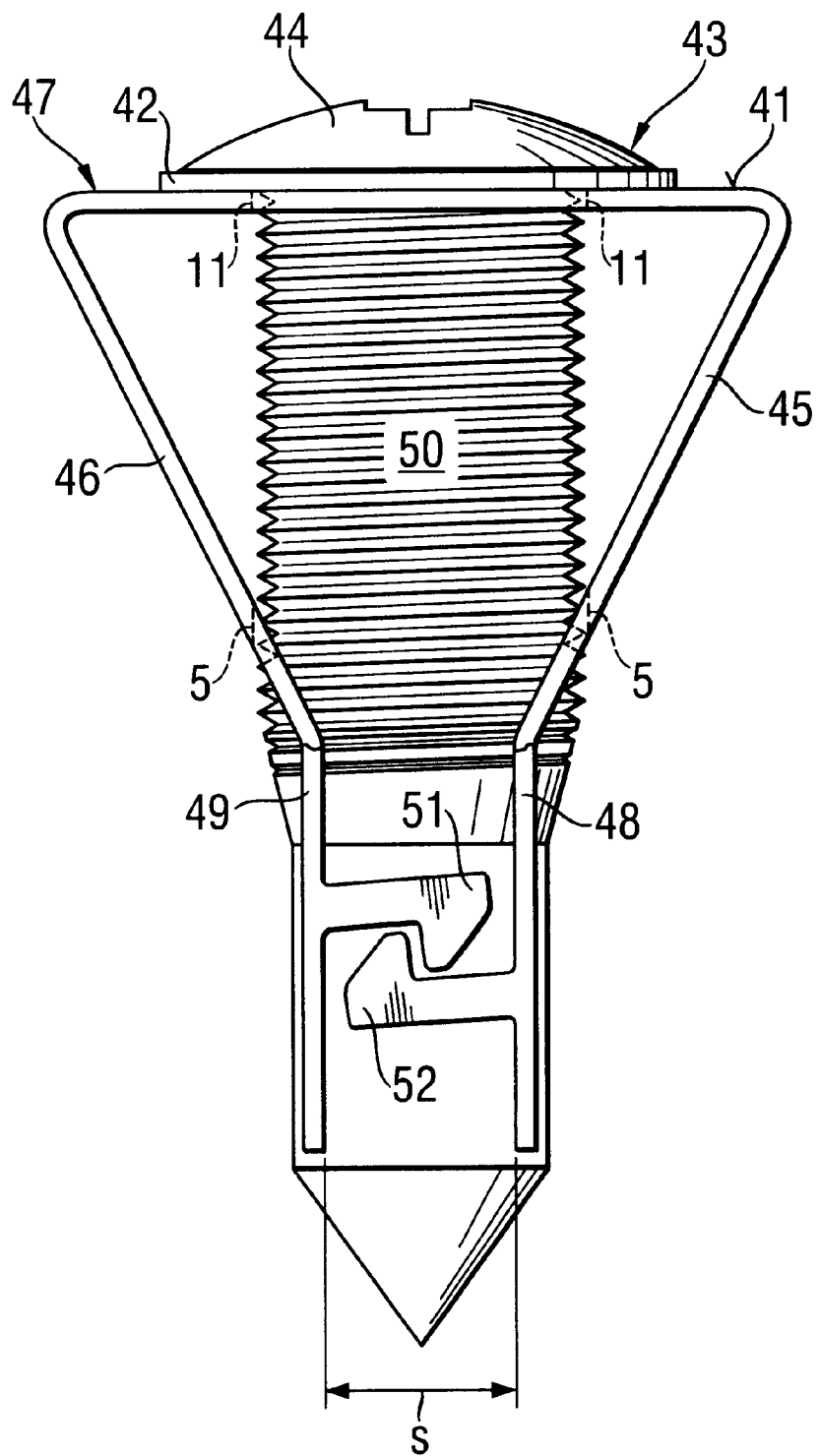

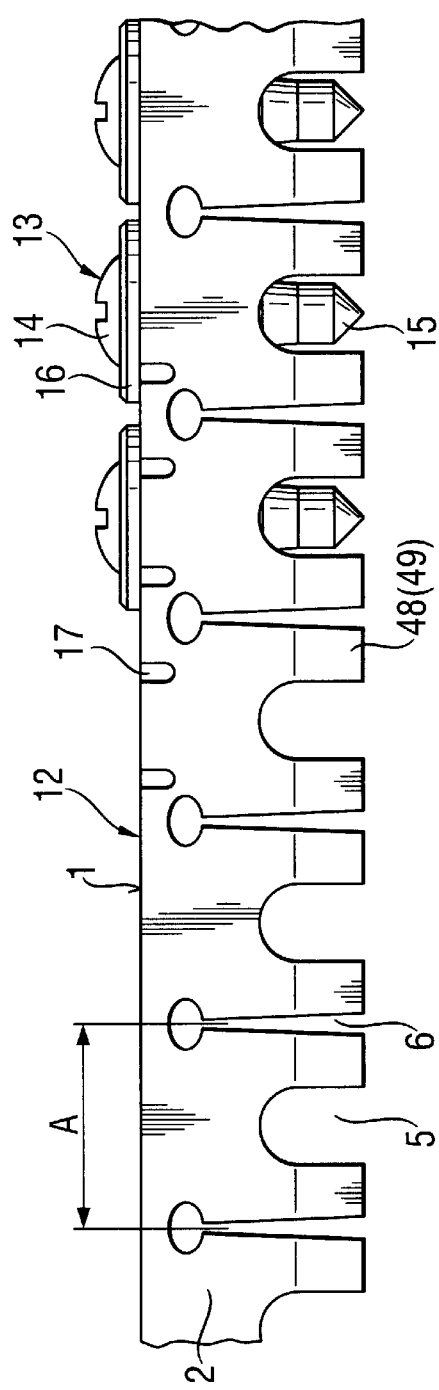
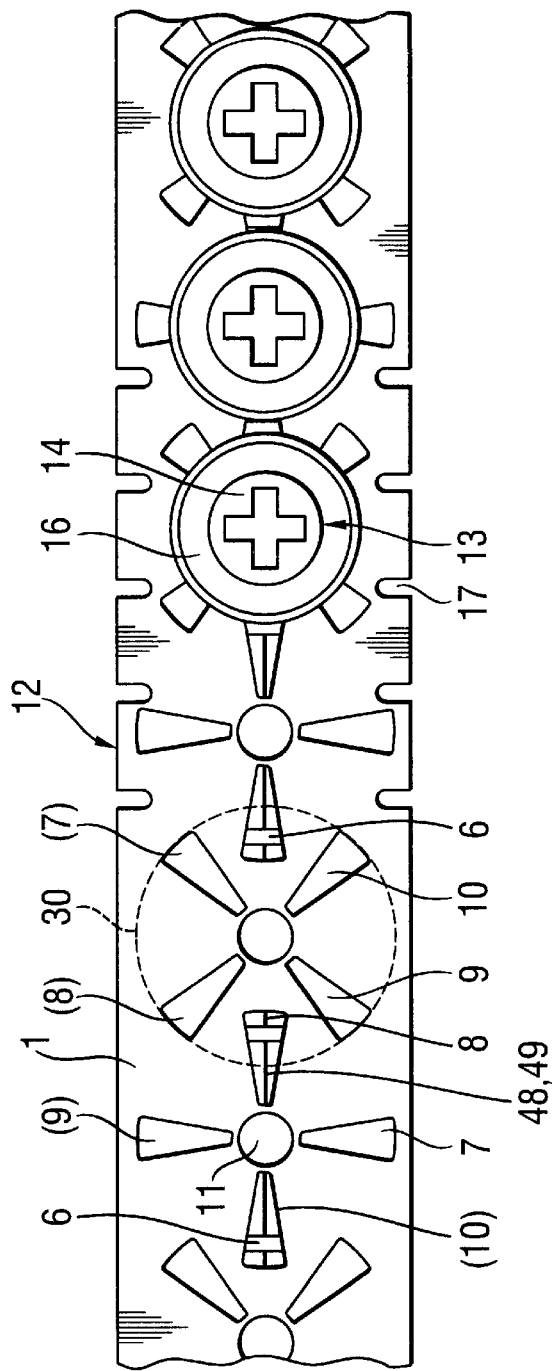

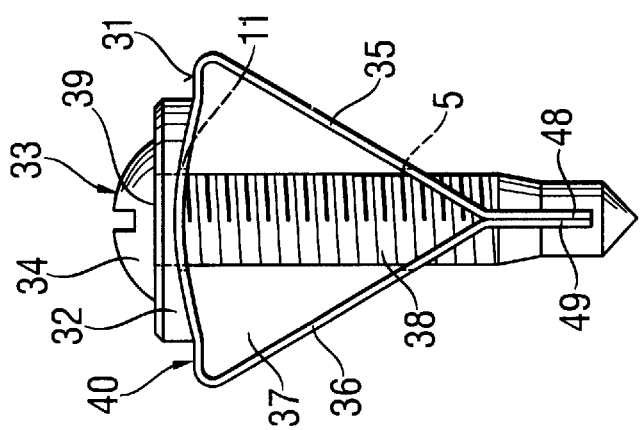
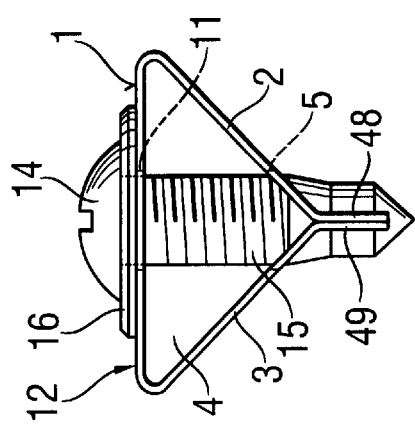
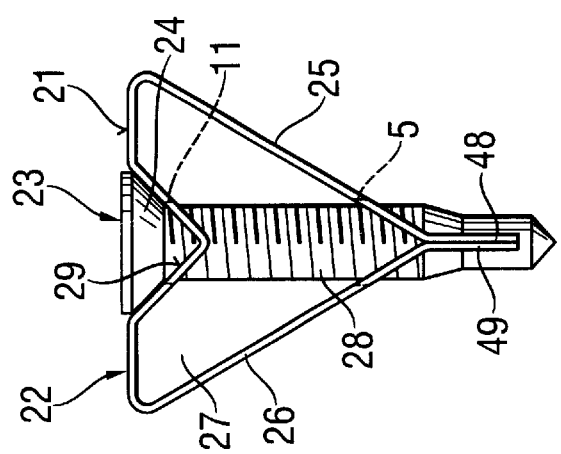

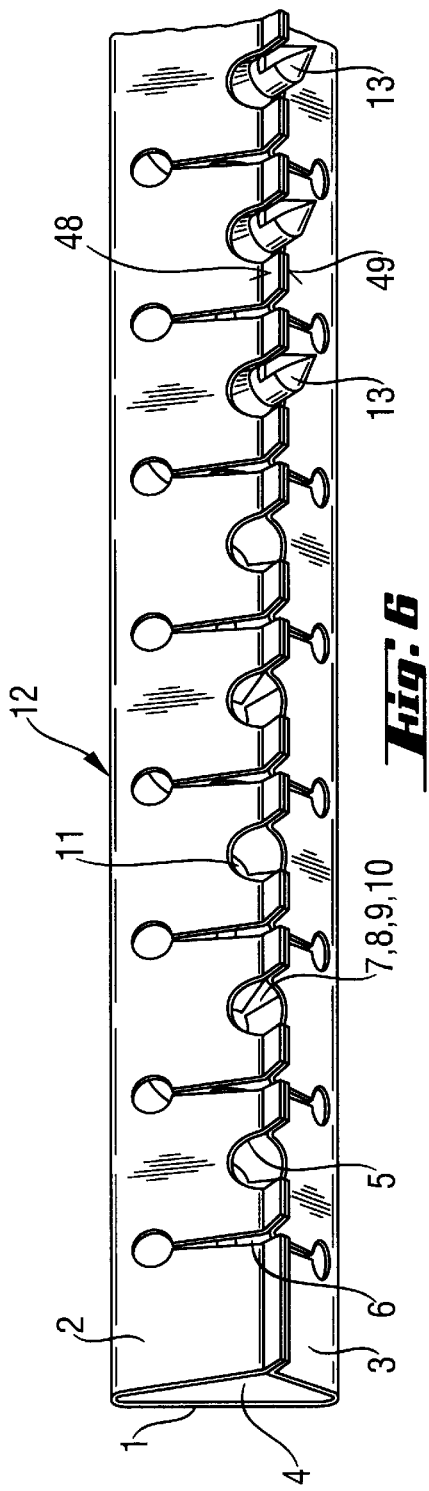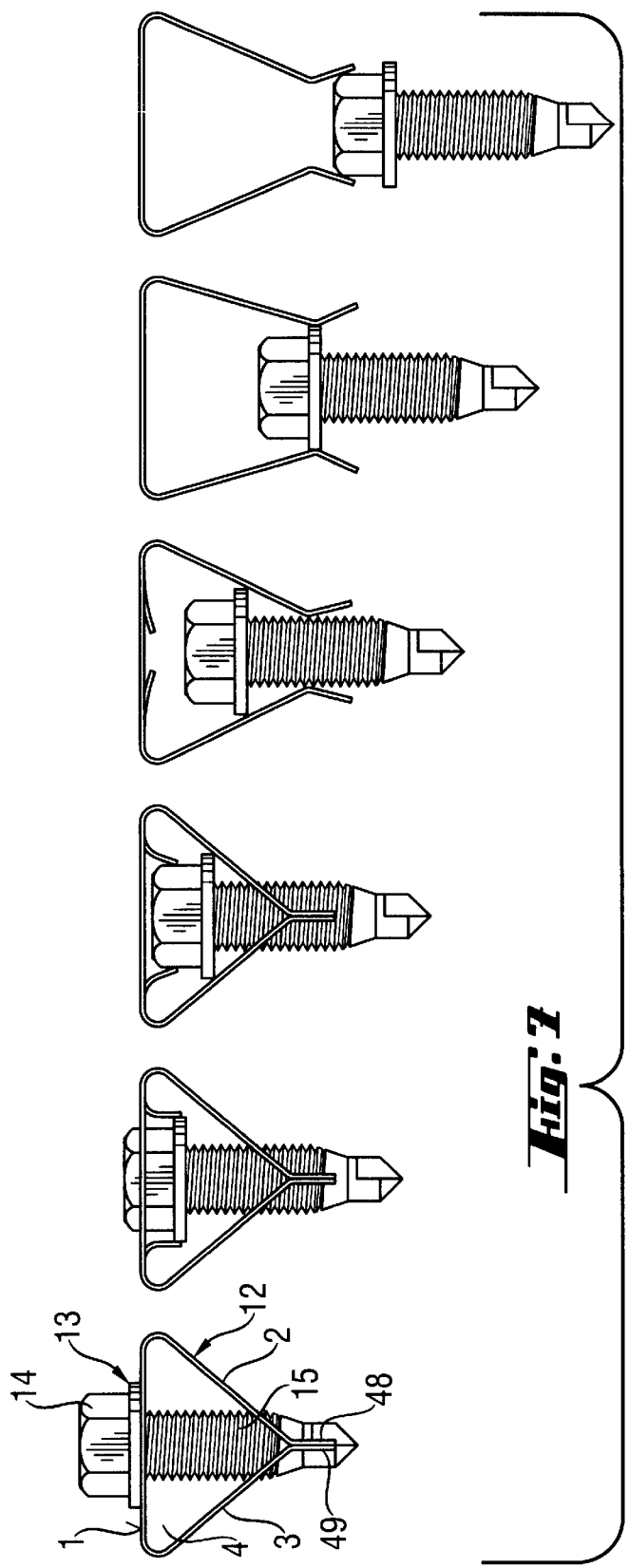

MAGAZINE FOR FASTENING ELEMENTS

BACKGROUND OF THE INVENTION

The invention relates to a magazine that serves to receive several fastening elements and held by elastic side members which pivot outwardly when the elements are driven.

DE-2 022 136 discloses a carrier that serves to receive and to guide several fastening elements arranged one behind the other and having a shaft and a head that project outwardly from the shaft in the radial direction. The magazine is made up of a support area from each of whose lengthwise edges a side area extends in the placement direction of the fastening elements. The free end areas of the two side edges are arranged adjacent to each other. Between the support area and the side edges, a chamber is formed that extends over the entire length of the carrier.

The entire magazine is divided into several receiving areas arranged one behind the other, each serving to receive one fastening element. The division is effectuated by means of cutouts that run essentially parallel to the placement direction of the fastening elements and that, starting from the free ends of the two side areas that touch each other, extend over a part of the side areas.

In the support area of each receiving area, there is an opening whose diameter is larger than the shaft of the fastening element and smaller than the head of the fastening element. Coaxial to this opening, there is a passage formed by the two end areas of the side areas whose diameter essentially matches the diameter of the shaft of the fastening element.

Since the head of the fastening element is situated in the chamber of the magazine, the element is guided mainly by the front section of the shaft on the side of the placement direction in the passage formed by the side areas.

SUMMARY OF THE INVENTION

The invention is based on the objective of creating a magazine with a carrier and several fastening elements, which is simple and cost-effective to manufacture, which ensures proper guidance of every single fastening element at two places on the shaft that are at a certain distance from each other, and with which the fastening elements are separated from the magazine without a need to exert much force.

In the magazine according to the invention, each fastening element is guided in the area of the shaft at two places that are spaced at a certain distance from one another. This guidance takes place with the opening in the support area and with the passage in the end area of the two side edges. Slits located in the support area divide the circumferential area of the opening into several circular ring segments that, during the placement process of the fastening element in the placement direction, can easily be pivoted down into the chamber of the magazine by means of the head of the fastening element or by means of a washer and/or shim mounted on the head and resting on the fastening element. After the head has traversed the opening, the outer contour of the head or of the washer and/or shim comes into contact with the inner surface of the two side areas, laterally expanding them so that the head or the washer and/or shim can leave the magazine without being hindered.

The head or the washer and/or shim of the fastening elements rests on the support area that is, for example, flat in shape, and thus on the outside of the magazine. So that this head can be pushed through the magazine without the expenditure of much force, it is necessary that the circular ring segments can easily be pivoted downwardly into the chamber of the magazine. To achieve this offset, preferably four slits are provided. With a larger number of slits, the length of the arc-shaped pivoting axis is reduced, thereby diminishing the resistance that counters the inward pivoting of the circular ring segments into the chamber.

Advantageously, the width of the slits increases as the distance from the opening increases. Thanks to this special shape of the slits, the arc-shaped pivoting axes of the circular ring segments that surround the openings are shortened so that these segments can be pivoted downwardly into the chamber with a smaller amount of force.

The length of the slits likewise has an influence on the pivoting behavior of the circular ring segments that surround the opening. For instance, the segments can be pivoted downwardly into the chamber more easily if the slits extend considerably beyond the outer contour of the head of the fastening element or washer and/or shim. Longer slits, with the fastening elements remaining at a constant distance from each other, can be achieved in that at least one slit running parallel to the lengthwise extension of the magazine as well as at least one slit running perpendicular to the lengthwise extension of the magazine are associated with a first opening, and slits running at an angle in the range of 30° to 60° with respect to the lengthwise extension of the magazine are associated with at least one adjacent opening.

An additional guidance of the fastening elements, with which the circular face of the head or of the washer and/or shim facing in the placement direction is convex or concave in shape relative to the placement direction of the fastening elements, can be achieved by means of the support surface. The support surface advantageously has a concave area or a convex area in the circumferential area of the opening.

For manufacturing-related reasons, the concave or convex areas preferably extend over the entire length of the carrier strip.

So that the magazine can be transported for example, in the transport mechanism of a tool by means of which the fastening elements can be inserted into a receiving material, the carrier strip advantageously has several transport means arranged one behind the other on which an advancing element of the transport mechanism can engage in a form-fitting manner.

So that a transport element of a transport mechanism can be brought into formfitting contact with the transport means of the magazine in a direction running parallel to the placement direction as well as perpendicular to the placement direction, preferably each of the transport means is formed by a recess situated in the lengthwise edges of the support surface. However, the transport means can also consist of individual boreholes arranged one behind the other in the support area, such boreholes being capable of interacting in a form-fitting manner with the advancing element of the transport element.

A center axis extending through the opening and the passage runs essentially perpendicular to the lengthwise extension of the magazine. This center axis, however, can also be arranged at an angle to the lengthwise extension of the magazine. This is especially the case if this magazine is not fed perpendicularly but rather at an angle to the placement direction into a tool with which the fastening elements can be inserted into an appropriate receiving material. The alignment of the cutouts is adapted, for example, to the position of the above-mentioned center axis in each case, i.e. the cutouts run essentially parallel to the center axis.

The carrier strip is made, for example, of a thin-walled polyester film. The thickness of this film is in the range of 0.15 mm to 1.5 mm. However, the carrier strip can also be made of a single-layer or multi-layered plastics material, paper, cardboard or sheet metal, the individual layers being joined to each other by means of adhesion, welding or compression. A carrier strip made of paper or cardboard can be provided, for example, with an impregnation against external influences, such as moisture or dirt in particular.

The slits are configured so as to be closed in the circumferential area of the opening. This closed area situated in the circumferential area of the opening consists of a small connection web that is destroyed during the placement process of the fastening elements, so that an unhindered pivoting of the circular ring segments into the chamber of the magazine is possible. The connection web ensures the uniform alignment of all of the circular ring segments before the placement process with the fastening elements.

Advantageously, the end areas of the elastic side members that are spaced from the opening are arranged at a certain distance from each other, the distance being smaller than the diameter of the shaft of the fastening element. This arrangement of the two end areas or parts has the advantage that, in the area of the shaft, the fastening element is guided by four edge areas of the passage formed by the two end parts, the edge parts being distributed linearly and essentially uniformly in the circumferential area of the shaft.

In order to be able to achieve a high dimensional stability, the end areas of the two side areas or members are advantageously connected to each other via a detachable, form-fitting connection.

BRIEF DESCRIPTION OF THE INVENTION

The invention will be explained in greater detail below with reference to drawings that show an embodiment. In the drawings:

FIG. 1—is a partial side view of the magazine according to the invention;

FIG. 2—is a top view of the magazine shown in FIG. 1;

FIG. 3—is a front view of another magazine in which the support surface has a concave surface;

FIG. 4—is a front view of the magazine shown in FIG. 1;

FIG. 5—is a front view of another magazine in which the support surface has a convex surface;

FIG. 6—is a bottom view of the magazine illustrated in FIG. 1;

FIG. 7—shows the individual stages in the placement process of a fastening element according to FIG. 1;

FIG. 8—is a front view of yet another magazine.

DETAILED DESCRIPTION OF THE INVENTION

FIGS. 1 through 8 show a magazine with an elongated carrier strip 12, 22, 40, 47 and several fastening elements 13, 23, 33, 43 arranged one following the other and spaced at a distance from each other in the elongated direction, whereby the carrier strip 12, 22, 40, 47 serves to receive and guide the fastening elements 13, 23, 33, 43. The fastening elements 13, 23, 33, 43 are, for example, screws, bolts or nails that have an axially extending shaft 15, 28, 38, 50 and a head 14, 24, 34, 44 that projects outwardly from the shaft 15, 28, 38, 50 in the radial direction. The carrier strip 12, 22, 40, 47 consists of a support surface 1, 21, 31, 41 and of two elastic side members 2, 3, 25, 26, 35, 36, 45, 46 that project from the support surface 1, 21, 31, 41 in the placement direction of the fastening elements 13, 23, 33, 43. The support surface 1, 21, 31, 41 as well as the two side members 2, 3, 25, 26, 35, 36, 45, 46 that extend essentially parallel to the placement direction enclose a chamber 4, 27, 37 that extends over the entire elongated direction of the magazine. The free end parts 48, 49 of the two side members 2, 3, 25, 26, 35, 36, 45, 46 facing away from the support surface 1, 21, 31, 41 are arranged adjacent to each other. These free end parts 48, 49 are not connected to each other. However, they can be detachably connected to each other by means of adhesion or welding.

The carrier strips 12, 22, 40, 47 are divided by a plurality of cutouts 6 into individual receiving areas A which are essentially connected to each other in one piece only via the support surface 1, 21, 31, 41. The cutouts 6 extend from the free end of the two side members 2, 3, 25, 26, 35, 36, 45, 46 to the vicinity of the support surfaces 1, 21, 31, 41. FIG. 2 shows that, in the support surface 1, 21, 31, 41, each receiving area A has an opening 11 whose diameter essentially matches the shaft diameter of the fastening element 13, 23, 33, 43. In each receiving area A, the two free end parts of both side members 2, 3, 25, 26, 35, 36, 45, 46 together form a passage 5 arranged coaxially to the opening 11. Both the opening 11 as well as the passage 5 serve to receive and guide the shaft 15, 28, 38, 50 of the fastening element 13, 23, 33, 43.

The support surface 21, 31 shown in FIGS. 3 and 5 is provided, for example, with a concave or convex area 29, 39 that is adapted to the outer shape of the head 24, 34 or of the washer and/or shim 32 facing in the placement direction. The concave or convex area 29, 39 is limited, for example, to the circumferential area of the opening. However, it is also possible, for instance, for this area 29, 39 to extend over the entire length of the carrier strip 22, 40, as schematically indicated in FIGS. 3 and 5.

As can be seen in FIG. 2, four slits 7, 8, 9, 10 are uniformly distributed in the circumferential area of the opening 11. Starting from the circumference of the opening 11, these slits 7, 8, 9, 10 extend in the radial direction all the way to an enveloping circle 30 that is arranged concentrically to the opening 11. The width of the slits 7, 8, 9, 10 increases as the distance from the opening 11 increases, and the diameter of the enveloping circle 30 is larger than the head diameter of the fastening element 13, 23, 33. At least one slit 8 running parallel to the elongated direction of the magazine as well as at least one slit 7 running perpendicular to the elongated direction of the carrier 12, 22, 40 are associated with a first opening 11, and slits 9, 10 extending at an angle of 45° with respect to the elongated direction of the carrier strip are associated with at least one adjacent opening 11. The slits 7, 8, 9, 10 can be configured so as to be closed, for example, in the circumferential area of the opening 11.

The transport of the magazine shown in FIGS. 1 through 8 in a transport mechanism of a tool (not shown here), with which the fastening elements 13, 23, 33, 43 can be inserted into a receiving material (likewise not shown here), is effectuated, for example, by several transport means arranged on the carrier strip 12, 22, 40, 47 one behind the other, with which an advancing element of the transport mechanism can engage in a form-fitting manner. These transport means are formed, for example, by recesses 17 arranged on the elongated edges of the support surfaces 1, 21, 31, 41.

FIG. 7 shows in six sub-figures the individual steps during the ejection of a fastening element 13, 23, 33, for example, a screw with a hexagonal head, from the carrier strips 12, 22, 40 using an appropriate screwing tool (not shown here). The first sub-figure in FIG. 7 shows the fastening element 13, 23, 33 in the starting position. The head 14, 24, 34 is resting on those circular ring segments of the support surface 1, 21, 31 that extend between the slits 7, 8, 9, 10. As soon as pressure is exerted on the fastening element 13, 23, 33 in the placement direction, these circular ring segments of the support areas 1, 21, 31 pivot down into the chamber 4, 27, 37. Subsequently, the outer contour of the head 14, 24, 34 comes into contact with the inside of the two side members 2, 3, 25, 26, 35, 36. The force acting essentially laterally onto these side areas 2, 3, 25, 26, 35, 36 causes the two side areas 2, 3, 25, 26, 35, 36 of the corresponding receiving area A to be pressed apart, so that the head 14, 24, 34 can also be pushed out of the chamber 4, 27, 37 of the carrier 12, 22, 40. In this process, for example, an adhesive or welded connection located between the ends parts of the side members 2, 3, 25, 26, 35, 36 is destroyed. The circular ring segments of the support surface 1, 21, 31 assume their original position once again after the fastening element 13, 23, 33 has been ejected from the carrier strip 12, 22, 40.

The magazine shown in FIG. 8 has a carrier strip 47 with which the end parts 48, 49 that follow the two side members 45, 46 are at a distance S away from each other. The distance S is smaller than the diameter of the shaft 50 of the fastening element 41. This arrangement of the two end parts 48, 49 has the advantage that the fastening element 41 in the area of the shaft 50 is guided by four edge surfaces of the passage formed by the two side members 45, 46 and the two end parts 48, 49, the edge surfaces being distributed linearly and essentially uniformly in the region of the shaft 50.

In order to be able to achieve a high dimensional stability of the receiving region, the end parts 48, 49 of the two side members are advantageously connected to each other via a detachable, form-fitting connection. This detachable, form-fitting connection is created, for example, by at least one hook-shaped element 51 that projects from one of the two end parts 48 and grasps in a form-fitting manner behind a part of the other end area or else behind another hook-shaped element 52 of the other end part 49. The formfitting connection is dimensioned in such a way that the form-fitting connection is released when a fastening element 43 is ejected from the receiving region of the carrier 47.

What is claimed is:

1. A magazine for holding fastening elements in spaced relation, said magazine comprises an elongated carrier strip (12, 22, 40, 47) with elongated edges spaced laterally apart, said fastening elements (13, 23, 33, 43) comprise a head (14, 24, 34, 44) having a diameter and a shaft (15, 28, 38, 50) extending axially from said head, said carrier strip (12, 22, 40, 47) has an upper support surface and a lower surface and a plurality of receiving areas (A) arranged one following the other in the elongated direction of said carrier strip and each arranged to receive and guide one of said fastening elements and each having a chamber (4, 27, 37) extending below the lower surface of said carrier strip, each said receiving area (A) having an opening (11) through said carrier strip and two elastic side members (2, 3, 25, 26, 35, 36, 45, 46) extending downwardly from said elongated edges of said carrier sup on opposite sides of said shaft of said fastening element in said receiving area (A), said side members (2, 3, 25, 26, 35, 36, 45, 46) spaced below said carrier strip are arranged adjacent to one another and together form a passage (5) spaced below and coaxially with said opening (11) for receiving and guiding said shaft (15, 28, 38, 50) of said fastening element (13, 23, 33, 43), wherein said opening (11) has a diameter matching the diameter of said shaft (15, 28, 38, 50) of said fastening element (13, 23, 33, 43) and said carrier strip (12, 22, 40, 47) has at least two slits (7, 8, 9, 10) extending radially outwardly from said opening (11) spaced uniformly around the circumference of the opening and extending outwardly to an imaginary circle (30) enveloping said opening and having a diameter at least equal to the diameter of said head (14, 24, 34, 44) of said fastening element (13, 23, 33, 43).

2. A magazine as set forth in claim 1, wherein said carrier strip has four said slits (7, 8, 9, 10) around each said opening (11).

3. A magazine as set forth in claim 1, wherein said slits (7, 8, 9, 10) have a width increasing radially outwardly from said opening (11).

4. A magazine as set forth in claim 1, wherein at least one said slit (8) extends parallel to the elongated direction of said carrier strip (12, 22, 40, 47) and at least one said slit (7) extends perpendicular to the elongated direction of said carrier strip 12, 22, 40, 47) and are associated with a first one of said openings (11) and said slits (9, 10) of an adjacent said opening (11) extend at an angle in the range of 300 to 600 relative to the elongated direction of said carrier strip (12, 22, 40, 47).

5. A magazine as set forth in claim 1, wherein said upper surface of said carrier strip (12, 22, 40, 47) has a support surface having one, of a concave surface (29) or a convex surface (30) in an area extending circumferentially around said opening (11).

6. A magazine as set forth in claim 5, wherein the one of said convex surface (30) and concave surface (29) extends over the length of said carrier strip (12, 22, 40, ±7).

7. A magazine as set forth in claim 1, wherein said carrier strip (12, 22, 40, 47) has individual transport means spaced apart in the elongated direction thereof.

8. A magazine as set forth in claim 7, wherein said transport means comprises recesses formed spaced apart in said elongated edges of said carrier strip (1, 21, 31, 41).

9. A magazine as set forth in claim 1, wherein said elastic side members (2, 3, 25, 26, 35, 36, 45, 46) on opposite sides of said carrier strip and spaced from said opening (11) are spaced apart by a dimension (S) less than the diameter of said shaft (50) of the fastening element (5).

10. A magazine as set forth in claim 9, wherein said elastic side members (48, 49) spaced from said opening (11) are connected to one another by a detachable form engaging connection (51, 52).

* * * * *